United States Patent [19]

Konomi et al.

[11] 3,995,471
[45] Dec. 7, 1976

[54] DEVICE FOR CALIBRATING A CHASSIS DYNAMOMETER

[75] Inventors: Toshiaki Konomi, Susono; Tsunehiko Machida, Kawasaki, both of Japan

[73] Assignees: Toyota Jidosha Kogyo Kabushiki Kaisha, Toyota; Kabushiki Kaisha Ono Sokki Seiksakusho, Tokyo, both of Japan

[22] Filed: Apr. 21, 1975

[21] Appl. No.: 569,936

[30] Foreign Application Priority Data
Dec. 9, 1974 Japan .......................... 49-141396

[52] U.S. Cl. .................................. 73/1 R; 73/1 B
[51] Int. Cl.² ........................................ G01L 25/00
[58] Field of Search ............ 73/1 R, 1 B, 117, 146, 73/8

[56] References Cited
UNITED STATES PATENTS

| | | | |
|---|---|---|---|
| 1,029,163 | 6/1912 | Wingo | 73/117 |
| 2,496,787 | 2/1950 | Fox | 73/117 |
| 3,148,535 | 9/1964 | Lemelson | 73/146 |
| 3,680,368 | 8/1972 | Warsaw | 73/117 |
| 3,683,683 | 8/1972 | Demidov et al. | 73/117 |

*Primary Examiner*—James J. Gill
*Assistant Examiner*—Anthony V. Ciarlante
*Attorney, Agent, or Firm*—Stewart and Kolash, Ltd.

[57] ABSTRACT

A device for calibrating a chassis dynamometer comprising a drive wheel for driving rollers of the dynamometer, said drive wheel being carried by a frame via a spring, a fluid pressure operated jack which selectively lifts up said drive wheel to disengage it from said rollers, a stay which partly supports said frame, and digital means associated with said rollers for determining the rotational speed of the same.

8 Claims, 2 Drawing Figures

DEVICE FOR CALIBRATING A CHASSIS DYNAMOMETER

BACKGROUND OF THE INVENTION

1. Field of the Invention:

The present invention relates to a device for calibrating a chassis dynamometer.

2. Description of the Prior Art:

As the regulations regarding the exhaust gas of automobiles has become stricter in recent years, higher precision in measuring of the exhaust gas contents has become more important and, since the operating condition of an automobile during exhaust gas measurement is determined by a chassis dynamometer, the precision of the chassis dynamometer is very important and it must be periodically calibrated. The calibration of a chassis dynamometer comprises calibrating its speedometer and brake horse power.

Conventionally, calibration of a chassis dynamometer has been made by employing analogue measuring devices such as tachogenerator, millivolt meter, etc, requiring a lot of processes and a large amount of man power. Nevertheless, the precision of calibration by the conventional method is not good and, if good calibration is to be made, the measuring devices themselves must be cared for with periodical precision maintenance. In the conventional calibration of a chassis dynamometer, rollers of the chassis dynamometer are first driven by a real automobile or a driving means equipped with a drive wheel or wheels which are particularly adapted to drive the rollers of the chassis dynamometer for the purpose of calibration. The rollers are driven up to a rotating condition which corresponds to a vehicle speed of 100 Km/h and then the automobile or the special driving means is swiftly lifted up by a jack driven by man power so that the driving wheels are swiftly disengaged from the rollers of the chassis dynamometer. This operation is very dangerous. To solve this problem in the aforementioned method and to improve the precision of calibration, an improved device for calibrating a chassis dynamometer has been proposed in Japanese Patent Application 88934/72, which comprises a driving source which rotates rollers of a chassis dynamometer, a pick up means which detects pulses generated in proportion to the rotation of said rollers, a digital computer including a digital counter and a trigger signal adjustor for computing speed and power absorbtion, a jack for disengaging said driving source from said rollers and associated compressor and oil hydraulic or air pressure means, and a control panel for controlling the aforementioned mechanisms and measuring devices.

In this prior device for calibrating a chassis dynamometer, after the rollers of the chassis dynamometer have been driven by the driving wheels of the driving source up to a predetermined high rotation, the axle of the driving wheels is lifted up by said oil or air pressure means to disengage the driving wheels from the rollers. In this case, in order to remove the driving wheels from contact with the rollers, the aforementioned oil or air pressure means must support not only the weight of the driving wheels and the axle but also the weight of the frame of the driving source (body or frame of an automobile or a special driving structure). Therefore, the oil or air pressure means must be of a large capacity if the jack-up operation is to be swiftly accomplished.

Therefore, it is the object of the present invention to solve the aforementioned problems and drawbacks in the conventional and formerly proposed devices for calibrating a chassis dynamometer and to provide an improved device therefor.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the abovementioned object is accomplished by a device for calibrating a chassis dynamometer, comprising: a drive source including a drive wheel adapted to be pressed against rollers of said chassis dynamometer by its own weight and spring force so as to drive and rotate said rollers, and a frame which carries said drive wheel via a spring which exerts said spring force; a fluid pressure operated jack which selectively lifts up said drive wheel so as to terminate the driving contact between said drive wheel and said rollers; a stay which bears a part of force which would be exerted to said drive wheel due to the weight of said frame; a pick-up means which detects pulses generated in proportion to the rotation of said rollers; a digital computer including a digital counter and a trigger signal adjustor for processing the pulses detected by said pick up means to compute the driven speed of and power absorbtion by the chassis dynamometer and a control panel for controlling said jack and said computer.

When calibration is made by employing the device of the aforementioned combination, after the rollers of the chassis dynamometer have been driven by said driving wheel up to a predetermined rotation, the jack is operated to lift up the drive wheel to disengage it from the rollers. In this case, since the weight of the driving source frame is partially supported by the stay, when the jack carries the weight of the driving wheel and its axle and lifts them up against the spring force of the spring, the driving wheel can be disengaged from the rollers before the jack completely suspends the frame of the driving source frame. Thus, it is possible to perform the jacking-up operation swiftly by employing a jack of a relatively small capacity. Furthermore, the stay provides for an additional stabilizing support of the driving source and improves safety in calibrating the operation of the chassis dynamometer.

According to a particular feature of the present invention, the stay may preferably be adapted to engage said frame at a location adjacent said drive wheel and carry said portion of the vehicle at a fixed vertical position with respect to said rollers, said position being intermediate the two extreme positions where the drive wheel suspended by said spring just contacts with said rollers and where the frame is completely suspended by the driving wheel via said spring.

According to another feature of the present invention, said drive source may conveniently be an automobile including a body which serves as said frame, a pair of drive wheels adapted to be driven by an engine mounted on said body, said drive wheels serving as said drive wheel which drives and rotates said rollers, and a pair of suspension springs which suspend said body against an axle for said pair of drive wheels. In this case, said fluid pressure operated jack may preferably be adapted to lift up said axle by means of an arm which is pivotably mounted to said body at one end thereof and supported by said jack at the other end thereof.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
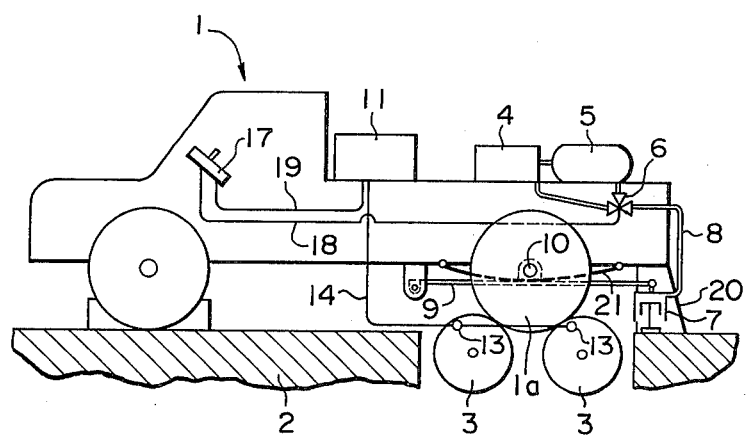
FIG. 1 is a diagrammatic elevational view of an embodiment of the device for calibrating a chassis dynamometer according to the present invention, and, FIG. 2 is a diagrammatical view which shows the digital computer and the pulse pick up means included in the device shown in FIG. 1 in more detail.

In the following, the present invention will be described in more detail with specific reference to the accompanying drawing element.

Referring to the drawing, 1 designates a driving source which drives the chassis dynamometer for the calibration of the same and is, in the shown embodiment, an automobile which is disposed on a base plate 2. The chassis dynamometer includes a pair of rollers 3 which, in calibration, are contact with a pair of rear wheels 1a of the automobile to be driven by said wheels.

Element 4 is a liquid or air compressor of any conventional type having an inlet port which is connected to a liquid or air reservoir 5. A liquid or air delivered from the compressor is led through a pipe 8 containing an electromagnetic valve 6 to a jack 7 mounted at a desired position above the base plate 2. Element 9 is an arm which is pivotably mounted to a bottom portion of the automobile 1 at one end thereof and pivotably connected to a movable member of the jack 7 at the other end thereof, said arm engaging the axle 10 of the rear wheels 1a at its intermediate portion so as to be able to support said axle.

Figure 2:
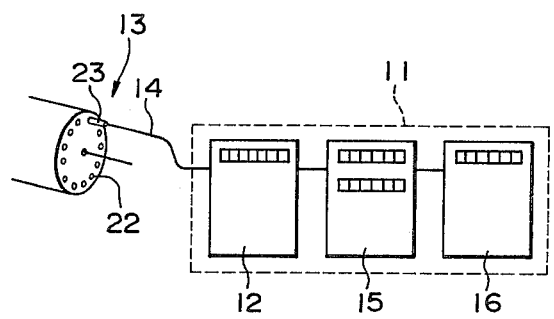

Element 11 is a digital computer which employs well known electronic techniques and includes, as shown in FIG. 2, a first digital counter 12 which is supplied with a pulse signal regarding the rotation of the rollers 3 through a line 14, said pulse signal being generated by a pick-up means 13 mounted at a side portion of the rollers 3. The pulse counter 12 counts pulses included in the pulse signal. The digital computer 11 further includes a second component which is a trigger signal adjustor 15. This component can be adjusted to generate a trigger signal when the number of pulses counted by the digital counter 12 per unit time traverses predetermined upper and lower limit values. One more component included in the digital computer 11 is a digital counter 16 which counts and indicates the number of pulses counted in the period between the instant when the trigger signal adjustor 15 detects the aforementioned upper and lower limit values and generates the trigger signals, said number being that of the pulses generated in the period during which the rollers 3 are decelerated from an upper limit rotational speed to a lower limit rotational speed, from which the number of rotations made by the rollers during the decelerating period is known.

Element 17 is a control panel for controlling the electromagnetic valve 6 and the digital computer 11 so as to actuate the fluid pressure jack or start counting by the digital computer 11 when required. The control panel 17 is connected to the electromagnetic valve 6 and the digital computer 11 by control lines 18 and 19.

Element 20 is a stay which supports the frame of the driving source or automobile 1. The vertical position at which the frame is supported by the stay is intermediate of a first position at which the wheels 1a are freely suspended by suspension springs 21 and just contact with the rollers 3 and a second position at which the driving source frame is completely supported by the wheels 1a via the suspension 21 and the axle 10.

The pick-up means 13 comprises pulse generating elements 22 mounted and equally spaced along a peripheral portion of a rotary member which rotates together with the rollers 3 or preferably the roller 3 itself, and a pulse sensing means 23 which detects the pulse generating elements and generates a pulsating signal.

When a chassis dynamometer is to be calibrated by the device described above, the device is set up as shown in FIG. 1 and the drive wheels 1a are driven to drive, in turn, the rollers 3. As the rollers 3 are rotated, pulses are detected by the pick-up means 13, said pulses being supplied to the digital computer 11, particularly its digital counter 12. The number of pulses counted per unit time by the digital counter 12 is processed in consideration of the outer diameter of the roller 3 to compute the peripheral velocity of the roller 3. Thus, by comparing the computed peripheral velocity with the indicated on a speedometer (not shown) equipped in the chassis dynamometer, the speedometer is calibrated. When the brake horse power of the chassis dynamometer is to be calibrated, first of all, the rollers 3 are driven up to a predetermined high speed condition by the drive wheels 1a and, thereafter, the jack 20 is actuated to lift up the drive wheels and disengage them from the rollers 3. Then, the rollers 3 are left to rotate freely. The rotational speed of the rollers 3 is gradually reduced and traverses predetermined upper and lower speed limits during its speed reducing process, thereby providing the time which is required for a decelerating from said upper to said lower speed limits. The time thus obtained is processed together with the inertia and mass of the rotating portions of the chassis dynamometer to compute the power absorbtion. According to the U.S. Federal Register, it is stipulated that the time required for deceleration from 55 mph to 45 mph after acceleration up to 60 mph, expressed in automobile speed, is to be measured. Therefore, when, for example, calibration is to be made according to the U.S. Federal Register, the trigger signal adjustor 15 is adjusted for an upper limit of 55 mph and a lower limit of 45 mph. As the rollers 3 gradually decelerate, the rotational speed thereof first traverses the aforementioned upper limit and a trigger signal is generated by the trigger signal adjustor 15, whereby the digital counter 16 starts to count pulses. As the rollers 3 further decelerate, the rotational speed thereof secondly traverses the aforementioned lower limit and a trigger signal is again generated by the trigger signal adjustor 15, whereby the digital counter 16 stops its counting action, indicating as a result, the number of pulses counted in the period between the instants when the aforementioned upper and lower limits were traversed. Of course, the digital counter 16 can directly indicate the number of rotation of the rollers in said period by properly processing said number of pulses.

In the following, analysis the number of pulse generating elements 22 in the pick-up means 13 is examined in consideration of the precision of the calibrating device. When the number of pulses per one rotation of the roller is expressed by P, the period T for each pulse is expressed by $$T = \frac{3600 \cdot \pi \cdot D}{P \cdot V} \times 10^{-6} \text{ (sec)}$$

wherein:
D = diameter of roller (mm)
V = velosity (Km/h)

Brake horse power (Psa) of the chassis dynamometer at an automobile velocity of Vm/sec is calculated by the following equation, based upon the process of first driving the rollers up to a predetermined high speed rotation and second releasing the to effect gradual deceleration:

$$Psa = \frac{V_2{}^2 - V_1{}^2}{2 \times 9.7 \times 75} \cdot \frac{W}{t}$$

wherein,
W = weight of vechicle (kg)
V2 = upper limit vechicle speed in the designated range (m/sec) $V_2 = 1.10V$
V1 = lower limit vehicle speed in the designated range (m/sec) $V_1 = 0.90$
t = decelerating time in the designated range (sec)

The measured value of the deceleration time includes an error which can be the addition of the period $T_2$ for each pulse at the upper designated speed $V_2$ and the period $T_1$ for each pulse at the lower designated speed $V_1$. Therefore, when the brake horse power absorption is calculated by the above equation, errors in velocity V and deceleration time T must be decreased, if the error in the result of the calculation is to be decreased. Assuming that the present calibrating device can be used for velocities between 30 and 100 Km/h and that the error in the brake horse power should be smaller than 0.1 ps, the error in the automobile velocity must be smaller than 0.1 Km/h at each point in the range from 30 to 100 km/h and the error in the deceleration time must be smaller than 20 msec. In order to satisfy these conditions, the peripheral length of the roller 3 and the number of the pulse generating elements 22 which are arranged along the periphery of the roller 3 must satisfy the following relations:

| Peripheral length of roller mm | number of pulses |
|---|---|
| 500–700 | 10 |
| 800–1400 | 20 |
| 1500–2200 | 30 |
| 2300–2900 | 40 |
| 3000–3700 | 50 |
| 3800–4400 | 60 |
| 4500–5200 | 70 |

From the foregoing, it will be appreciated that in the device for calibrating a chassis dynamometer according to the present invention, the jack may be of a smaller capacity even when a relatively heavy automobile is employed as the driving source allowing for stable support of the driving source or automobile frame during operation of calibration work. Also, high precision calibration can be easily accomplished by the combination of the aforementioned pick-up means and the digital computer. Furthermore, when the number of the pulse generating elements 22 and the peripheral length of the roller satisfy the aforementioned relation, calibration of the brake horse power can be performed with very high precision as mentioned above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. A device for calibrating a chassis dynamometer comprising a drive source including a frame and at least one drive wheel which is supported by said frame through an axle and suspension spring means and pressed against rollers of the chassis dynamometer, a fluid pressure-operated jack means which selectively engages said axle and is adapted to lift up said axle in a direction so as to disengage said drive wheel from said rollers, a stay which supports said frame in a manner so as to bear a substantial part of the weight of said frame, said drive wheel also bearing a substantial part of the weight of said frame through said axle and said spring means, a pick-up means which detects pulses generated in proportion to the rotation of said rollers, a digital computer including a digital counter and a trigger signal adjustor operatively connected with said pick-up means for processing the pulses detected by said pick-up means to compute the driving speed of the chassis dynamometer and the power absorption by the chassis dynamometer and a control panel for controlling said jack means and said computer.

2. The device according to claim 1, wherein said drive source is an automobile including a body which serves as said frame, a pair of drive wheels adapted to be driven by an engine mounted on said body, said drive wheels serving as said drive wheel which drives and rotates said rollers, an axle which supports said drive wheel, and a pair of suspension springs which suspend said body against said axle.

3. The device according to claim 1, wherein said roller is provided with pulse generating elements which are equally spaced along the peripheral portion of said roller, the number of said elements being selected in relation to the diameter of a circle along which said elements are arranged so as to satisfy one of the following conditions;
10 for diameter 500–700 mm
20 for diameter 800–1400 mm
30 for diameter 1500–2200 mm
40 for diameter 2300–2900 mm
50 for diameter 3000–3700 mm
60 for diameter 3800–4400 mm
70 for diameter 4500–5200 mm 4. The device of claim 1, wherein said stay supports a substantial part of the weight of said frame, even when said axle has been lifted up by said jack means while biasing said suspension spring means so far that said drive wheel is completely disengaged from said rollers.

5. The device of claim 1, wherein said fluid pressureoperated jack means comprises a piston-cylinder actuator and an arm which is pivotably mounted to said actuator at one end thereof and pivotably mounted to said body at the other end thereof, said arm being adapted to engage said axle at an intermediate position thereof.

6. A device for calibrating a chassis dynamometer containing roller means which comprises a vehicle disposed on a base plate, said vehicle including a vehicle frame, an axle, suspension spring means and at least one drive wheel, said drive wheel being supported by said frame through said axle and suspension drive means and being adapted to engage the roller means of said chassis dynamometer, a fluid pressure-operated jack means disposed near said drive wheel, an arm member provided for engagement with an intermediate portion of the axle, said arm member being pivotably mounted to the bottom portion of the vehicle on one side of said axle and pivotably mounted to said jack means on the other side of said axle, a stay which supports said frame in a manner so as to bear a substantial part of the weight of said frame, said drive wheel also bearing a substantial part of the weight of said frame through said axle and said spring means, a pick-up means mounted to the side portion of the roller means for detecting pulses generated in proportion to the rotation of said rollers, a digital computer including a digital counter and a trigger signal adjustor operatively connected with said pick-up means for processing the pulses detected by said pick-up means to compute the driving speed of the chassis dynamometer and the power absorption by the chassis dynamometer, and a control panel for controlling said jack means and said computer.

7. The device according to claim 6, wherein the jack means is disposed behind the drive wheel at the rear of the vehicle.

8. The device of claim 6, wherein the stay is disposed at the rear of the vehicle.

* * * * *